United States Patent
Tuchman et al.

(10) Patent No.: US 7,881,454 B2
(45) Date of Patent: Feb. 1, 2011

(54) INTEGRATED CALL MANAGEMENT

(75) Inventors: Kenneth D. Tuchman, Englewood, CO (US); Intae Myong, Thornton, CO (US); Bruce Sharpe, Aurora, CO (US); Henry Truong, Chelmsford, MA (US); James Radzicki, Englewood, CO (US)

(73) Assignee: Teletech Holdings, Inc., Englewood, CO (US)

( * ) Notice: Subject to any disclaimer, the term of this patent is extended or adjusted under 35 U.S.C. 154(b) by 1182 days.

(21) Appl. No.: 11/450,189

(22) Filed: Jun. 8, 2006

(65) Prior Publication Data

US 2007/0041527 A1 Feb. 22, 2007

Related U.S. Application Data

(60) Provisional application No. 60/689,279, filed on Jun. 10, 2005.

(51) Int. Cl.
*H04M 3/00* (2006.01)
*H04M 15/00* (2006.01)

(52) U.S. Cl. .................. 379/266.01; 379/114.13; 379/122; 379/126; 379/266.07; 705/14.1; 705/14.4; 705/14.41

(58) Field of Classification Search ............. 379/111, 379/88.01, 88.04, 112.01, 114.01, 115.01, 379/115.03, 121.01, 121.05, 122, 126, 265.01, 379/265.11, 266.07, 266.1, 309, 112.06, 379/114.12, 114.13, 265.02; 370/352–359

See application file for complete search history.

(56) References Cited

U.S. PATENT DOCUMENTS

| | | | | |
|---|---|---|---|---|
| 6,084,953 | A * | 7/2000 | Bardenheuer et al. | 379/114.01 |
| 6,470,079 | B1 * | 10/2002 | Benson | 379/114.13 |
| 6,636,590 | B1 * | 10/2003 | Jacob et al. | 379/114.05 |
| 6,744,877 | B1 * | 6/2004 | Edwards | 379/265.02 |
| 6,947,537 | B2 * | 9/2005 | Pershan | 379/207.02 |
| 7,609,829 | B2 * | 10/2009 | Wang et al. | 379/201.01 |
| 7,623,632 | B2 * | 11/2009 | Bushey et al. | 379/88.01 |
| 2002/0034290 | A1 * | 3/2002 | Pershan | 379/207.02 |
| 2002/0090076 | A1 * | 7/2002 | Uppaluru et al. | 379/265.04 |
| 2003/0007622 | A1 * | 1/2003 | Kalmanek et al. | 379/219 |
| 2005/0129211 | A1 * | 6/2005 | Gallagher et al. | 379/265.02 |
| 2006/0142010 | A1 * | 6/2006 | Tom et al. | 455/445 |
| 2008/0043954 | A1 | 2/2008 | Newsom et al. | 379/142.01 |
| 2008/0089508 | A1 * | 4/2008 | Lee | 379/265.11 |

* cited by examiner

*Primary Examiner*—Binh K Tieu
(74) *Attorney, Agent, or Firm*—Stanley J. Gradisar Attorney At Law, LLC; Stanley J. Gradisar

(57) ABSTRACT

In embodiments, the present invention is directed to methods of handling calls received from customers. In one embodiment, the method includes receiving a call from a customer who called a promotional telephone number. The phone call is connected to an IVR system. The IVR system maintains a set of rules for handling calls. The method further includes creating a call detail record, which includes a unique identifier, a source telephone number, and the promotional telephone number. A customized greeting is then played to the customer based on the promotional telephone number the customer dialed. Based on the rules for handling calls, the call is redirected from the IVR system to an agent along with transmitting and displaying the call detail record to the agent.

20 Claims, 9 Drawing Sheets

INTEGRATED CALL MANAGEMENT

CROSS REFERENCE TO RELATED APPLICATIONS

This application claims priority to U.S. Provisional Patent Application No. 60/689,279 entitled INTEGRATED CALL MANAGEMENT SYSTEM filed Jun. 10, 2005, which is hereby incorporated by reference in its entirety as if set forth herein in full.

TECHNICAL FIELD

This application relates generally to telecommunications and more particularly to a system and method for handling and monitoring telephone communications.

BACKGROUND

It is common for a commercial enterprise, such as a car client, cable TV company, or the like, to maintain a telephone number through which the commercial enterprise receives calls from its customers, referred to as callers. The telephone number may be advertised as a general customer service number or may be specifically associated with a product, promotion, advertising campaign or service of the commercial enterprise. In any case, in order to provide better customer service, in addition to simply servicing the call, commercial enterprises would like to obtain as much information as is possible about the calls received. Some information that may be useful to commercial enterprises include the identity of the caller, the caller's location, the subject of the call, if follow-up is needed, and whether the call was handled appropriately.

Moreover, commercial enterprises spend large sums of money on marketing and promotional campaigns to sell their products or services. It would be useful if an enterprise could determine the relative effectiveness of their campaigns, such as whether a print campaign has been more effective at generating business than a radio or television campaign.

It is with respect to these and other considerations that the present invention has been developed. Although specific problems have been described above, the present invention and the claims appended below are not intended to be limited to solving the specific problems identified above.

SUMMARY OF THE INVENTION

In accordance with the present invention, telecommunications problems are solved by a system that combines an interactive voice response (IVR) service with call tracking, monitoring and redirect service that enables clients to analyze the overall effectiveness of their marketing campaigns. Using on-line delivery of in-depth reporting and analysis, the combined service provides insight into where and who is responding to each marketing campaign through the use of managed toll free and local numbers that are unique to each ad, media and placement. The system also records the voice interaction of the call between the customer and the client (or with the agent if calls are delivered to a central call center) to a client accessible web site so that clients may listen, prioritize call backs and improve call handling techniques by listening to client-customer interactions.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

The present invention, in embodiments, is directed to systems and methods for managing telephone calls from callers regarding commercial products or services, and specifically for efficiently gathering data from and recording such calls. In some embodiments, the present invention also provides for ensuring that every call made to a commercial enterprise is answered by a trained professional. This maximizes an enterprise's opportunities to generate revenue from phone calls.

Figure 1:
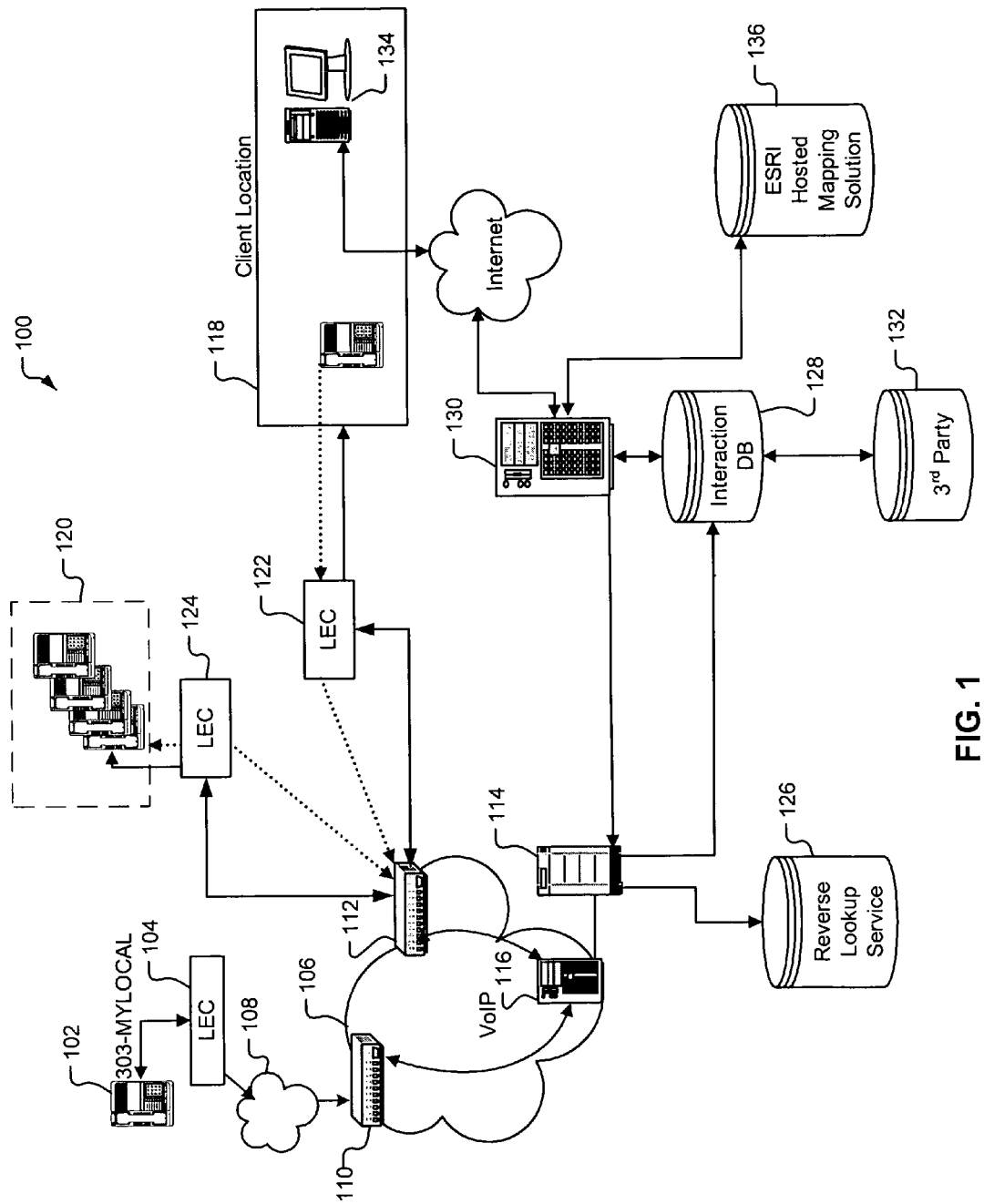
FIG. 1 shows an embodiment of a communication system in accordance with an embodiment of the present invention.

FIG. 1 shows an embodiment of a communication system 100 in accordance with an embodiment of the present invention. In the embodiment shown, a caller desires to contact the commercial enterprise via a destination telephone number known to the caller. The caller uses a traditional or mobile telephone (referred to as the "source telephone") 102 to call a telephone number associated with the commercial enterprise. Such a destination telephone number is referred to as the DNIS. The acronym DNIS stands for "dialed number identification service" which is a telephone function that sends the dialed telephone number to an answering service. The DNIS need not be a telephone number associated with any physical location even though the commercial enterprise may in fact have a client location 118 where it operates a call center or otherwise provides its own telephone support service capability.

The embodiments of the present invention do not require that a DNIS of a 1-800 number be used. Any DNIS number may be used, local, long distance or toll free. In some embodiments, the DNIS number used results in the call being transferred into a VoIP network as discussed in greater detail below.

The source telephone 102 will have a telephone number, referred to as the ANI or automatic number identification (arbitrarily given the telephone number 303-MYLOCAL in FIG. 1), and a location. The ANI is a signaling system feature in which a series of digits, either analog or digital, are included in the call identifying the source telephone 102 number of the calling device. In the case of a mobile phone, a mobile source telephone 102 will have a telephone and, at the least, be associated with some location, even if only for billing purposes. In addition, the actual physical location may be known depending on the sophistication of the mobile phone service and such information may also be provided to characterize the call.

In system 100, the source telephone 102 is connected to a local exchange company (LEC) 104. The LEC 104 may be a traditional local exchange, a mobile exchange or an Internet-based telephone service provider. The LEC 104 typically owns and maintains the "last mile" of communications equipment, such as telephone wires, local switches, cell towers, or broadband infrastructure that directly interacts with the telephone and connects the source telephone 102 with the national telephone communication network. LEC 104 may be owned and operated by a local telephone company or other service provider.

The function of LEC 104 is to open a physical connection between the source telephone 102 and a main exchange and maintain that connection until the call is completed. In the case of a traditional landline telephone, LEC 104 has a connection that carries data in the form of an analog voice telephone signal. The analog signal also includes, at least at the initiation of the call, the ANI and DNIS of the call, which allows the call to be routed to the proper destination. For mobile and Internet-based telephone systems, the connection carries packetized, digital data that embody the telephone signal.

The main exchange analyzes the information provided by LEC 104 and subsequently routes the call, typically through another main exchange and another LEC serving the destination telephone number, to the final destination. In this way a connection between the source telephone 102 and a destination telephone number is created.

Referring back to FIG. 1, the analog voice signal from the source telephone 102 is transferred by the LEC 104 to a VoIP service provider's network 106. In an embodiment, the transfer occurs because the DNIS is a number that is assigned to the VoIP provider network 106. The transfer either may be a direct transfer to the VoIP network 106 from the LEC 104 or an indirect transfer in that the LEC 104 must transfer the call to one or more additional exchanges before the call may be routed to the VoIP network 106. Thus, in embodiments of the present invention the call is not serviced at a single LEC 104 and any number of LECs may source and route calls to the same DNIS so that the calls are handled by systems remote from and independent of the local exchanges.

In the VoIP network system 106 shown in FIG. 1, each LEC 104 directly connects to the VoIP network 106 via a Signal Transfer Point (STP) 108. A STP 108 is a node in the network 106 that communicates with central offices to assist in routing.

The VoIP provider network 106 handles the conversion of the signal provided by the source telephone's LEC 104 into a VoIP signal. In system 100, such conversion is performed at "media gateways" 110 and 112. Generally, a media gateway (which may also be referred to as a Session Border Controller or SBC) is a device that may be considered the interface point between the equipment maintained by the source telephone's LEC 104 and the VoIP provider network 106. SBCs are put into the signaling path between calling and called party. The SBC acts as if it was the called VoIP phone and places a second call to the called party. The effect of this behavior is that not only the signaling traffic, but also the media traffic (voice, video etc) crosses the SBC. Without an SBC, the media traffic travels directly between the VoIP phones. Private SBCs are used along with firewalls to enable VoIP calls to and from a protected enterprise network. The media gateways 110 and 112 may also be the point at which STP is implemented. In that instance, the implementation of STP may be considered an element of the conversion performed by the media gateways 110 and 112.

Preferably, the conversion performed by media gateways 110 and 112 includes converting the LEC's 104 signal regardless of its format (e.g., analog voice signal, mobile digital data, or Internet telephony formatted digital data) into a SIP VoIP signal. As part of the conversion process, the source telephone 102 number (i.e., the ANI) and the destination number of the call (i.e., that number dialed by the caller known as the DNIS) are retrieved from the LEC's 104 signal and included as data within the SIP VoIP digital packets that carry the call.

Embodiments of the present invention utilize the VoIP network 106 because it provides many advantages and benefits. These advantages include but are not limited to:

1. Ability to manage call termination from any carrier to any carrier;
2. Ability to transfer from SIP to traditional time division multiplexed (TDM) facilities;
3. Ability to support call decision and routing from any carrier to any carrier;
4. Ability to support disaster routing between IVR systems (described in detail below) without additional technologies;
5. Ability to redirect to or invite other providers or solutions into the session;
6. Ability to provide carrier grade IVR functionality with custom recording and processing;
7. Ability to capture and track cradle to grave reporting for all interactions; and
8. Ability to avoid charges when hauling call from local area to the remote network IVR and back to a local area where the call terminates. Normally, in a VoIP network routing calls within the network such as from a LEC to the network IVR are free, regardless of the physical locations of the LEC and the network IVR system. This is an important financial advantage when offering local DNIS numbers as is the case in some embodiments of the present invention.

In embodiments of the present invention, the DNIS is a destination telephone number corresponding to an interactive voice response (IVR) system 114 directly connected to the VoIP network 106 (a network IVR). In the embodiment shown in FIG. 1, a proxy server 116 in the VoIP network 106 is used to direct the call to the network IVR system 114. One example of an IVR system is a speech-enabled IVR systems provided by XO Interactive or Vail Systems™. The IVR system 114 is an electronic system that provides a messaging service in which the system receives calls and plays messages to callers in the form of automated voice responses. In some embodiments, IVR system 114 also prompts the caller for additional inputs, such as pressing numbers on a touch tone telephone or simple voice commands, and in response to the inputs plays different messages. The IVR system 114 is directly connected to the VoIP network 106, which is distinct from client IVR systems that are maintained by individual clients and are generally connected to the telephone system through an LEC. The network IVR system 114 can accept, interpret and manipulate the VoIP packets directly as well as obtain and use additional electronic data, which a traditional client IVR system cannot do; being designed to handle only voice calls in the form they transferred over an LEC or delivered to a source telephone.

The network IVR system 114 may also redirect calls in real time to a secondary destination telephone number (i.e., a number different than the DNIS dialed by the caller), such as to the client location 118 or to a third party call management center (CMC) 120 through their respective LECs 122 and 124 as shown in FIG. 1. Such rerouting may be in response to user inputs received in response to prompts provided by the messaging service or may be performed automatically, such as after playing a certain message. This IVR system 114 functionality allows a commercial enterprise to use the IVR system 114 both as an answering service and as an automated switchboard operator.

In some embodiments, system 100 may include duplicate network IVR systems 114 connected to VoIP network 106. Using separate network IVR systems at separate IVR datacenters provides redundancy to protect against any communication path or equipment failures.

How and when the network IVR system 114 redirects calls is dictated by the needs of the commercial enterprise. As part of initializing the architecture for a commercial enterprise, a set of rules (not shown) are defined by the commercial enterprise that dictates what messages are played when, what prompts are requested, when calls are to be redirected and to what secondary number or numbers to redirect the calls to. In addition, embodiments of the present invention allow rules to be created that differentiate between the time of day and day of the week so that calls received during working hours may be redirected to a different secondary destination than those received on holidays, for example.

One aspect of embodiments of the present invention is that the network IVR system 114 can control the rerouting of calls so that the same call may be redirected to multiple secondary destinations over time. This ability to maintain control over the rerouting of calls allows the network IVR system 114 to conform to additional rules related to the actions of the secondary destinations. For example, the IVR system 114 may be given a rule to redirect all calls to a customer service number maintained by the commercial enterprise 118, but if the redirected call is not answered by a service representative within a predetermined number of rings as defined in the rule, to then redirect the call to a continuously manned third party call center (e.g. CMC 120). This rule allows the commercial enterprise to use a third party call center for over flow calls while still ensuring that the caller will not be waiting for too long before talking to a representative.

In embodiments of the present invention, the network IVR system 114 performs additional functions in addition to the prompting and rerouting of calls. For each call received by the IVR system 114, the network IVR system 114 creates a call detail record (CDR) specific to the call. This includes assigning each call with a unique identifier and storing that identifier in the CDR for that call. The CDR is a record of information associated with the received call. At the least, the CDR includes the DNIS and ANI numbers associated with the call, which were originally provided by the source telephone's LEC 104. The CDR may also include any additional information that would be useful to the commercial enterprise. For example, in an embodiment the caller's responses (voice, touch tone or both) to the prompts of the messaging service are stored as data in the CDR to record how the caller navigated the messaging service. In another embodiment, the rerouting of the call may be monitored by the network IVR system 114 and pertinent information, such as how many rings did the caller hear before a representative at the secondary destination answered the call, was the call redirected multiple times, and after how many did the caller terminate the call, may be stored in the CDR.

The network IVR system 114 is also capable of retrieving data associated with a specific call from third party data sources. In the embodiment shown in FIG. 1, a reverse telephone lookup service 126 provided by a third party data provider is accessed. Based on the ANI of the caller obtained from the IVR system 114, the reverse telephone lookup can be performed in real time to collect additional information regarding the caller, such as the location of the source telephone 102 (e.g., street address, city, state, and country) and may also identify the owner or registrant of the telephone number. Additional information may also be obtained from the reverse lookup service 126 or other databases may be consulted to obtain additional information based on the information provided by the reverse lookup service 126. The information obtained from the third party data sources is stored in the CDR along with the other data received from the LEC 104, the network IVR 114, and generated by the VoIP service provider's network 106.

In the embodiment shown, the information is obtained from third parties in real time. That is, as soon as practicable the network IVR system 114 requests and retrieves the information from the third party data providers. In an alternative embodiment, the network IVR system 114 periodically retrieves such information in a batch fashion for all recently received calls.

In the embodiment shown in FIG. 1, the CDR for each call is stored to an interaction database 128 and includes the unique identifier of the call, start time of the call, end time of the call, the vox which is a digital voice recording of the call, the ANI of the source telephone 102, and the name and address retrieved from the reverse lookup service 126. In one embodiment, an initial CDR is created as soon as practicable containing all available information at that time and immediately stored to the interaction database. Then, as additional information, (e.g., the end time of the call, the interaction recording, and information concerning redirection of the call) becomes available, the CDR on the interaction database 128 is revised to include the new information or overwritten with a more complete CDR containing the new information.

The interaction database 128 is a data repository for CDRs that can be accessed by the commercial enterprise, such as through a portal server 130 as shown. This allows the commercial enterprise to retrieve CDRs for calls in real time as necessary, such as during the servicing of the call by the client location 118. In addition, up to date information in the form the CDRs is available for analysis and review by the commercial enterprise at any time. The interaction database 128 may also have access to additional third party data resources 132 on a batch basis, as shown, or in real time depending on the needs of the client.

The portal server 130, in addition to providing access to the interaction database, also provides the commercial enterprise access via the Internet to the network IVR system 114. A client administrator with the proper access authority can access the network IVR system 114 through an Internet connection from any computer, such as a computer 134 at the client location 118 as shown. Through this access, the commercial enterprise has the ability to change or revise the IVRs rules as necessary. In addition, this access also allows the commercial enterprise an easy means for providing its own voice recordings from their client location 118. Such voice recordings can be uploaded to the network IVR system 114 easily and stored on the network IVR system 114 for use in responding to later calls as long as the format of the voice recording is compatible with the network IVR system 114.

Another feature of system 100 is the creation of a complete recording of the call, referred to as a vox file or "vox" for short, for later analysis. Because the network IVR system 114 maintains control over the call, it is possible for the network IVR system 114 to create a complete recording of the call, capturing not only the caller's responses to prompts but also the caller's interactions with service representatives, voice messaging services or other secondary destinations that a call may be redirected to. In the event that a call is redirected multiple times, this allows a single, complete recording of the caller's total interaction to be created.

As the vox will not be complete until the caller terminates the call, in one embodiment the vox is not transmitted to the interaction database until the call is terminated, and the vox file is converted to a format (MP3) that can be readily played back using readily available audio players. In the embodiment, the vox is provided with the unique identifier of the call so that the vox can be positively associated with the CDR of the same call, even though the CDR may have been transmitted during the lifetime of the call. The vox may be maintained as a separate file that is associated with a call and it's CDR by the unique identifier. Alternatively, the vox may be stored as part of the CDR.

In some embodiments, system 100 also includes a mapping database 136. Mapping database 136 includes information for generating maps of various geographical locations, e.g., such as street maps and road maps. In one embodiment of the present invention, the mapping database 136 is used to generate maps that relate the location of one or more callers to a geographic location. For example, a client may wish to pinpoint the location of each and every caller. In this embodiment, the caller information from the CDR, which may have been obtained from reverse look up service 126, is used to create a map that shows the geographic location of each caller on a map. Those with skill in the art will appreciate a number of embodiments that may be implemented that include the use of mapping information obtained from mapping database 136.

Below are embodiments of the present invention that are described with reference to operational flows. Some of the operational flows are described as being performed by components of system 100. However, it should be understood that this is merely one embodiment, and the operational flows described below are not limited to being implemented by system 100, and may in other embodiments be implemented using any suitable system. Moreover, although the operational flows are described as operations being performed in a specific order, the invention is not limited to the specific order. As those with skill in the art will appreciate, the operations may be performed in a different order than described below, and/or simultaneously with other operations.

The logical operations of some embodiments of the present invention are implemented (1) as a sequence of computer implemented acts or program modules running on one or more computing systems and/or (2) as interconnected machine logic circuits or circuit modules within the computing systems. The implementation is a matter of choice dependent on the performance requirements of the computing system implementing the invention. Accordingly, the logical operations making up some embodiments of the present invention described herein are referred to variously as operations, structural devices, acts or modules. It will be recognized by those of skill in the art that these operations, structural devices, acts and modules may be implemented in software, in firmware, in special purpose digital logic, and any combination thereof without deviating from the spirit and scope of the present invention as recited within the claims attached hereto.

Figure 2:
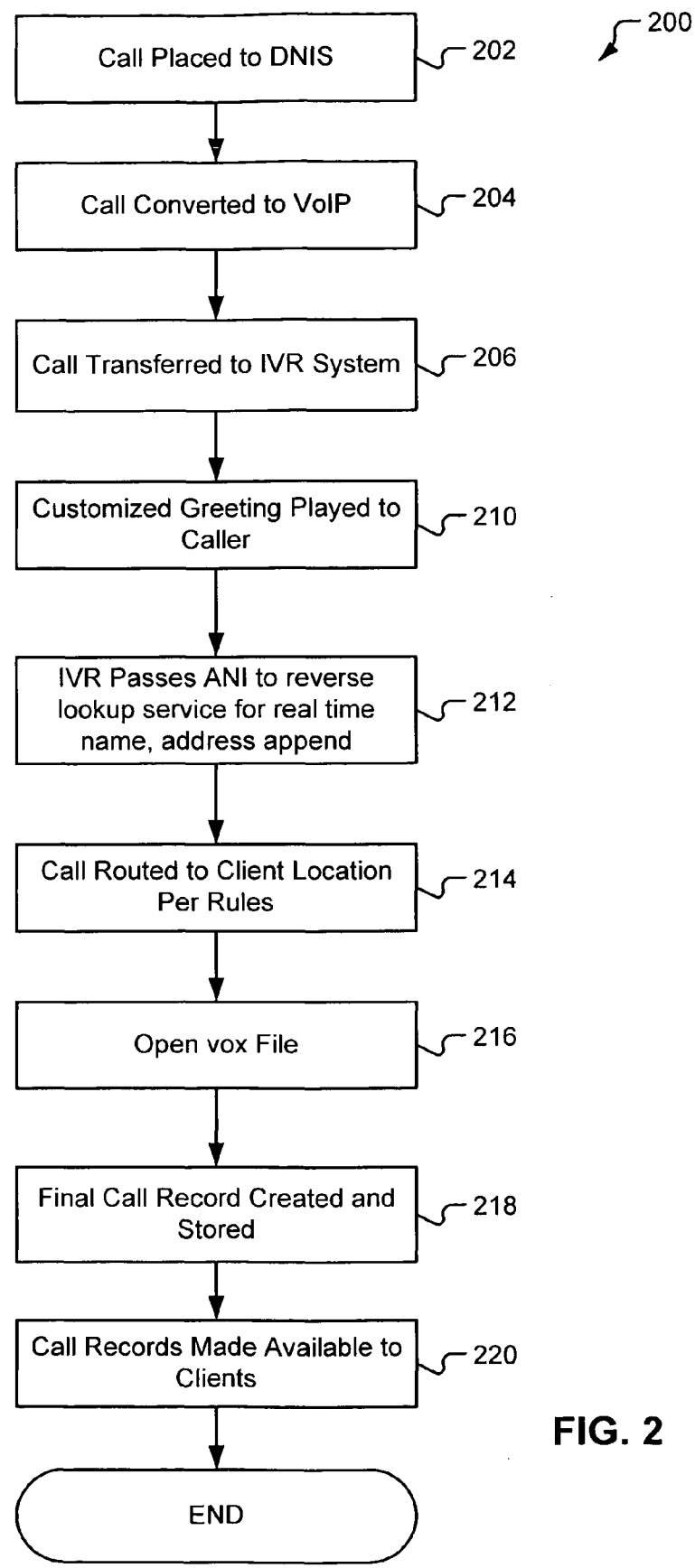
FIG. 2 illustrates an embodiment of an operational flow for handling a telephone call in accordance with an embodiment of the present invention.

FIG. 2 illustrates an operational flow 200 for handling a telephone call in accordance with an embodiment of the present invention. The operational flow starts with operation 202, where a call is made by a caller to a DNIS managed by system 100 (FIG. 1). Because the DNIS is assigned to the VoIP service provider, the call is routed through the source telephone's LEC 104 to the VoIP provider's network 106.

After the connection is made to the VoIP network 106, the call is converted at operation 204 into a SIP VoIP form. As discussed above, this conversion may be performed by media gateway 110 at the interface between the LEC 104 and the VoIP network 106. In addition, the conversion may include using the STP protocol to assist in the traversal of the VoIP network 106.

At operation 206, the VoIP network 106 transfers the call now embodied in a series of digital packets to the network IVR system 114. At the network IVR system 114, the call is received and a unique identifier is assigned to the call. In an alternative embodiment, the unique identifier may be assigned upon entry of the call into the VoIP network 106 or at some other point during the transmission of the call through system 100. In any case, the unique identifier is now used to differentiate the call from any others received by the network IVR system 114.

In response to receiving the call, a prerecorded, customized greeting is played back to the caller at operation 210. This involves the reading and transmission of the greeting back through the VoIP network 106, media gateway 110, and LEC 104 to the source telephone 102.

At operation 212, the IVR 114 passes the ANI of the call to the reverse lookup service 126 as part of a request for information concerning the ANI. In real time, the reverse lookup service 126 responds with the name and address associated with the ANI and this information is stored into a CDR for the call. In some embodiments, the CDR may be created when the call is first received by the network IVR system 114, such as when a unique identifier is generated by the network IVR system 114 for the call. Alternatively, the CDR may be created when predetermined information in addition to the unique identifier, such as the response from the reverse lookup service 126, becomes available. In either case, upon creation the CDR, even though it is not yet complete in that some information has yet to be determined, is transmitted to the interaction database 128 for storage. The CDR stored in the interaction database 128 will be finalized upon the end of the call and, also may be periodically revised to include new information as a call is redirected to a series of secondary destinations.

Flow then passes to operation 214, where the network IVR system 114 follows rules provided by the commercial enterprise with respect to messaging, prompting and redirecting the call. As shown in flow 200, the call is ultimately redirected by operation 214 to a secondary destination number as dictated by the rules.

As soon as the call is redirected, a vox file is opened at operation 216 for the call using the unique identifier, and the communications between the caller and the customer service representation of voice system at the secondary destination number are recorded. In an alternative embodiment, recording may be initiated upon receipt of the call by the network IVR system 114. However, as the possibilities for interaction between the caller and the network IVR system are dictated by the rules, the caller's interaction may be more efficiently captured as part of the CDR making vox recording of the IVR session duplicative.

Upon completion of the call, the CDR in the interaction database is finalized at operation 218 and the completed vox is transmitted to the interaction database for storage. As will be discussed in greater detail below, the completed vox may be copied into a more convenient format, e.g., MP3. In an embodiment of the present invention, the vox is converted into an MP3 file at a specified bit rate to ensure quality of the playback. Operational flow then passes to operation 220, where the CDR and vox for the call are made available for review and analysis by the commercial enterprise.

Figure 3A:
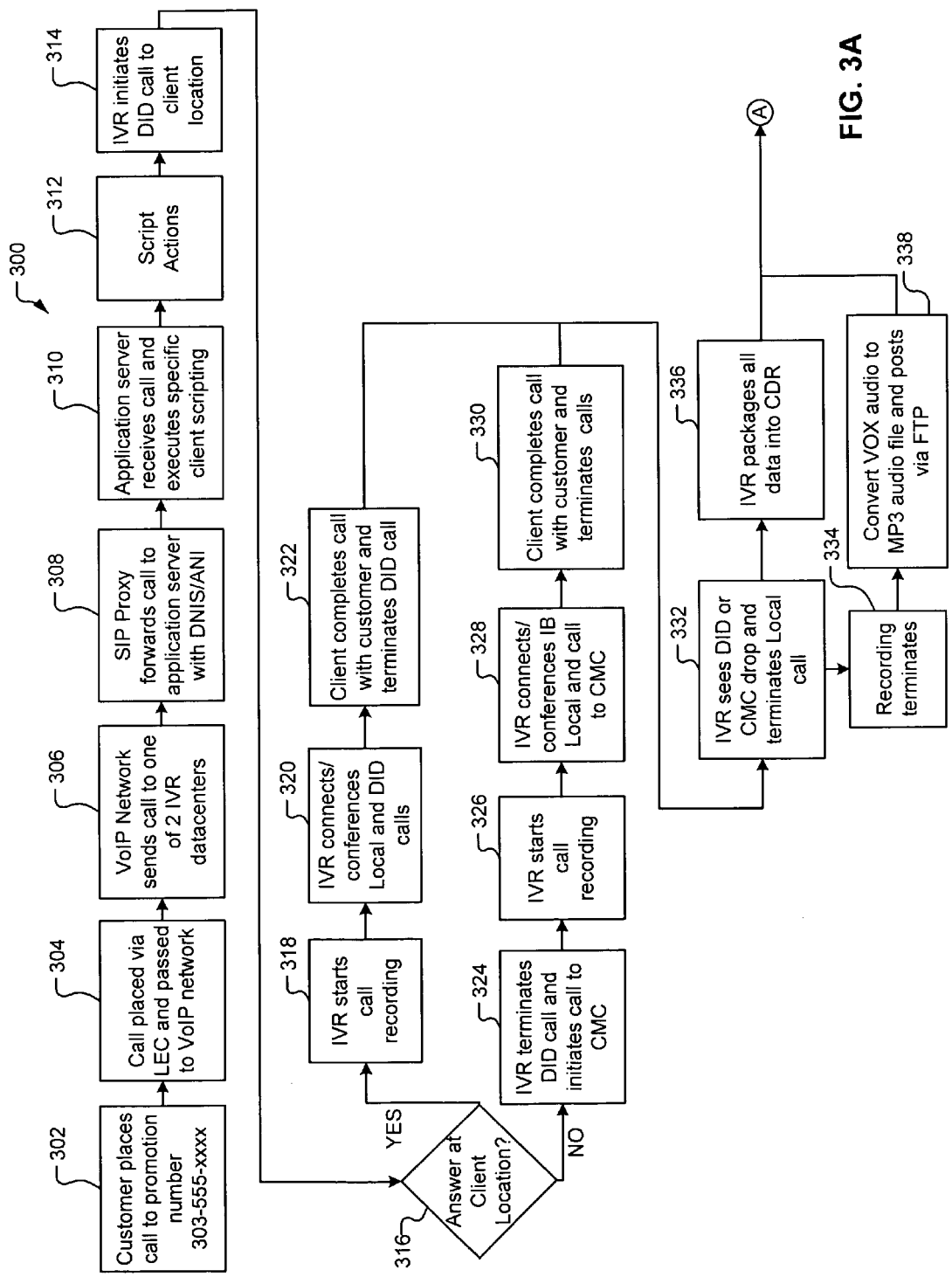
FIG. 3A illustrates another embodiment of an operational flow 300 for handling a telephone call in accordance with the present invention.

FIG. 3A illustrates operational flow 300 for handling a telephone call in accordance with another embodiment of the present invention. Operational flow 300 starts with operation 302 where a caller places a call to a DNIS used for a promotional offering of the commercial enterprise, referred to as the "client" in the following description. The call is placed by the caller from a location with the phone number of 303-555-XXXX. The LEC 104 passes the call to the VoIP network 106 at operation 304. In one embodiment, the LEC 104 provides the call in a digital format (time division multiplexed or TDM) that must be converted into a SIP form.

At operation 306, the VoIP network 106 transmits the SIP call to network IVR system 114 connected to the VoIP network 106. In this operation, depending on the implementation details of the network IVR system 114, a conversion from the SIP VoIP format to an IVR system 114 format may be necessary.

SIP proxy 116 forwards the call to an application server at operation 308. The information associated with the call, including the ANI and DNIS of the call are also provided to the application server. At operation 310, the application server receives the call and executes the rules for the DNIS. This may entail retrieving and executing a script that contains the rules or otherwise contains the directions that can be interpreted by the application server. In one embodiment, the rules are contained in an executable script that is associated with the DNIS called by the caller. As each application server may support more than one commercial enterprise and DNIS, this method ensures that the appropriate rules set are used for each call.

Next, the script's execution dictates the actions of the application server within the network IVR system. These actions are performed at operation 312 and may include obtaining data from a reverse lookup service, messaging the caller, prompting the caller for and receiving caller input (e.g., playing an introduction message allowing the caller to choose to hear the messages in a different language). The actions may also include what secondary destination numbers to call at what points in the messaging script. In one embodiment, the destination number that is called is based on the caller's inputs.

Operation 314 directs the network IVR 114 to initiate a call to the client's location 118 using the secondary destination number in the script. In some embodiments, the script includes rules dictating how a redirected call should be handled. For example, the rules may require the network IVR system 114 to determine if a call redirected to the client location is answered or not, as determined by how many rings the customer hears before there is an answer at the client location. In process flow 300, this is illustrated at decision 316. To do this, the network IVR system 114 makes a separate telephone call to the secondary destination, in this case the client location 118, and monitors the call.

If the call is answered within the predetermined number of rings, operational flow passes to operation 318, where the network IVR system 114 begins recording the call, and at operation 320 connects the first call from the customer to the second call from the IVR to the secondary destination. In one embodiment, the two calls are connected via a conferencing technique so that the IVR maintains separate control over each call while still being able to record the interaction between the customer and the representative at the client location. Finally, at operation 322 the call between the customer and client location will terminate as the call is completed.

If the call is not answered within the predetermined number of rings, operational flow passes from decision 316 to operation 324 where the network IVR system 114 will terminate the telephone call made to the secondary destination and initiate another call, in this case to another secondary destination that is a third party CMC 120. In one embodiment, the third party CMC 120 is manned around the clock so an answer by a CMC 120 service representative is assured. When the network IVR system 114 detects that the call has been answered, at operation 326 the network IVR system 114 begins recording the call. The network IVR 114 connects the first call from the customer to the call from the IVR 114 to the CMC 120 at operation 328. Again, the two calls are connected in such a way that the IVR 114 may record the interaction between the parties while still maintaining separate control over the calls. Finally, the call between the customer and CMC 120 terminates at operation 330.

At the termination of the call from the customer, regardless of outcome of the call and where the call was ultimately connected, at operation 332 the network IVR system 114 will make sure that both connections (i.e., the connection from the caller to the network IVR system 114, and the separate connection from the network IVR system 114 to the secondary destination) are closed. The recording of the call is then stopped at operation 334 and a final vox file is created.

Operation 336, performed concurrently with operation 334, is where the network IVR system 114 packages all data obtained during the call and into a CDR and transmits the CDR to an interaction database 128. The transmission of the CDR may be over the Internet or by some dedication connection. The transmission may use standard transport protocols such as SOAP or HTTP protocols depending on how the interaction database is implemented. The CDR may be in any form that can be interpreted by the interaction database, such as a comma delimited text format or using a more advanced format such an data identifying markup language like XML.

The vox is also transmitted to the interaction database at the completion of the call. In some embodiments, prior to transmission, the vox also is converted to a format suitable for use by the interaction database. For example, in flow 300, operation 338, which may occur concurrently with operation 334, converts the vox into the standard MP3 format for storage on the interaction database and replay over an Internet connection by the client. In some embodiments, the MP3 file may be transmitted alone, while in other embodiments, the MP3 file will be transmitted with the unconverted vox to the interaction database 128. In one embodiment, the vox is sent as part of the CDR at operation 336.

Figure 3B:
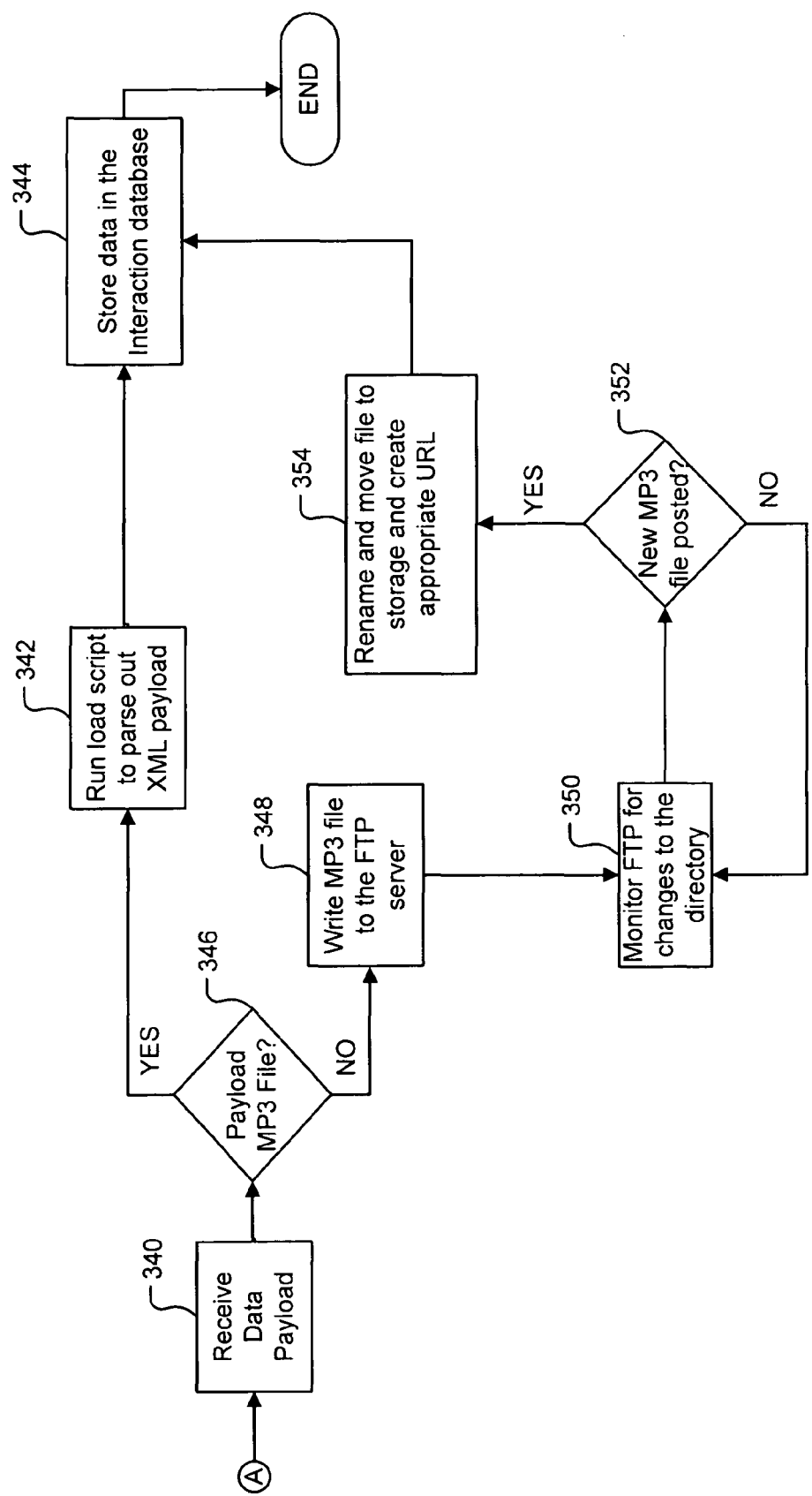
FIG. 3B illustrates additional operation of operational flow 300.

FIG. 3B is a continuation of flow 300 and illustrates additional operations. Process flow 300 continues by performing operations to store a data payload in the interaction database 128. The data payload may be a CDR, vox and/or other data to be added to an existing CDR stored in the interaction database 128. Operation 340 receives a data payload from the IVR system 114. The data payload is associated with its call via the unique identifier, which in some embodiment is the session ID of the call.

Upon receipt of the data payload flow passes to decision 346 where a determination is made whether the data payload is an MP3 file. If the data is not an MP3 file, for example if it is a CDR or data to be added to a CDR, flow passes to operation 342 where a load script is executed that parses the received data from the data transport packet. In one embodiment, the XML data may be parsed from the data packet and only the XML data passed to the next operation 344. Operation 344 loads the parsed data into the interaction database to create a CDR, or add information to a CDR, associated with a call.

If at decision 346 it is determined that the data payload is an MP3 file, flow passes to operation 348 where the MP3 file is written to a file transfer protocol (FTP) server. A file monitoring operation 350 monitors the FTP server's file system. Decision 352 determines whether a new MP3 file has been saved into the FTP server. If no MP3 files have been posted, operation flow loops to operation 350 to continue monitoring of the FTP server. If a new MP3 file has been posted, flow passes to operation 354, where the MP3 file is renamed and moved to a storage location on a server through which the file may be accessed by a uniform resource locator address (URL).

Operational flow then passes to operation 344 where the CDR corresponding to the MP3 file is found in the interaction database 128, and using the session ID, the MP3 file is associated with the CDR by storing the URL of the MP3 into the CDR as a data element.

As previously stated, operational flow 300 is intended to be illustrative of one embodiment of the present invention. In some embodiments of the present invention flow 300 may include additional operations, while in other embodiments flow 300 may include less operations than those described above. Those with skill in the art will appreciate that in embodiments, some of the operations described above may be performed simultaneously. For example, in one embodiment two calls may be handled by a system in accordance with flow 300 with one call being handled by a client as described above with respect to operations 318, 320 and 322, while another call is handled by a CMC as described with respect to operations 324, 326, 328 and 330.

Figure 4:
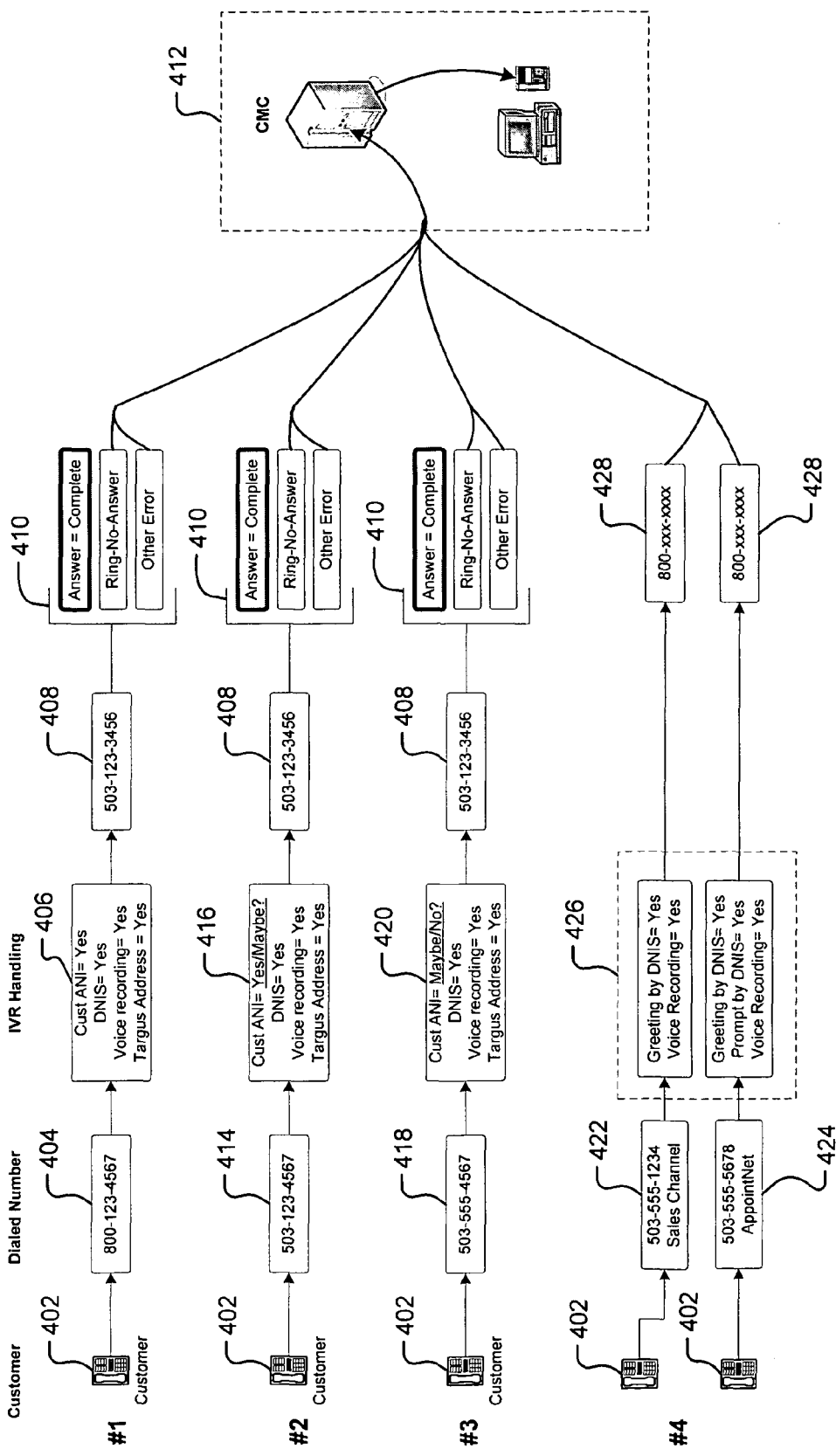
FIG. 4 is a diagram showing exemplary scenarios for rules and services provided by a system in accordance with an embodiment of the present invention.

FIG. 4 is a diagram showing several example scenarios that may be handled using embodiments of the present invention. In scenario #1, a customer 402 of a commercial enterprise is provided a DNIS (a direct 800 number) 404. When called, the DNIS 404 is routed to a network IVR system for handling 406. While handling the call the IVR system also records, in a CDR, the ANI and DNIS along with the address information obtained from a reverse lookup service 126 (FIG. 1). The call is redirected using number 408 to the commercial enterprise, in this figure referred to as a "client" and a voice recording of the call is made. The rules 410 indicate how the call is handled after it has been transferred to the client. For example, if the call is answered, then the call is complete. However, if the call is not completed to the client's number, for whatever reason, the rules dictate that the call is redirected to the CMC 412.

In scenario #2, a customer 402 of the client is provided a DNIS 414, in this case a local number that is redirected to an 800 number without the caller's knowledge. The DNIS 414 ultimately connects the call to the IVR system for handling 416. Such a redirection may affect the ability to identify the ANI of the call, as shown by the "Cust ANI=Yes/Maybe" entry in the scenario description for the IVR system handling 416. Otherwise the second scenario is substantially the same as the first scenario.

In scenario #3, the customer is provided a DNIS 418 that is the client's actual number supported by the client's private branch exchange (PBX) system, i.e., a private telephone network. The PBX system then forwards all calls to a second DNIS that connects the call through the LEC and VoIP network to the network IVR system for handling 420. Otherwise the third scenario is substantially the same as the first scenario. In another embodiment of scenario #3, a receptionist answers the call and manually forwards the call to the IVR system for handling 420.

At the bottom of FIG. 4 is yet another scenario, scenario #4, in which separate DNIS numbers 422 and 424 are provided for different messaging and support services all sent to network IVR system for handling 426. The network IVR system is capable of differentiating the services provided based on the original DNIS (422, 424) dialed by the customer, so the client need only forward calls that may have been made to two separate client DNIS to a single second DNIS 428 of the network IVR system for routing to the CMC 400.

Figure 5:
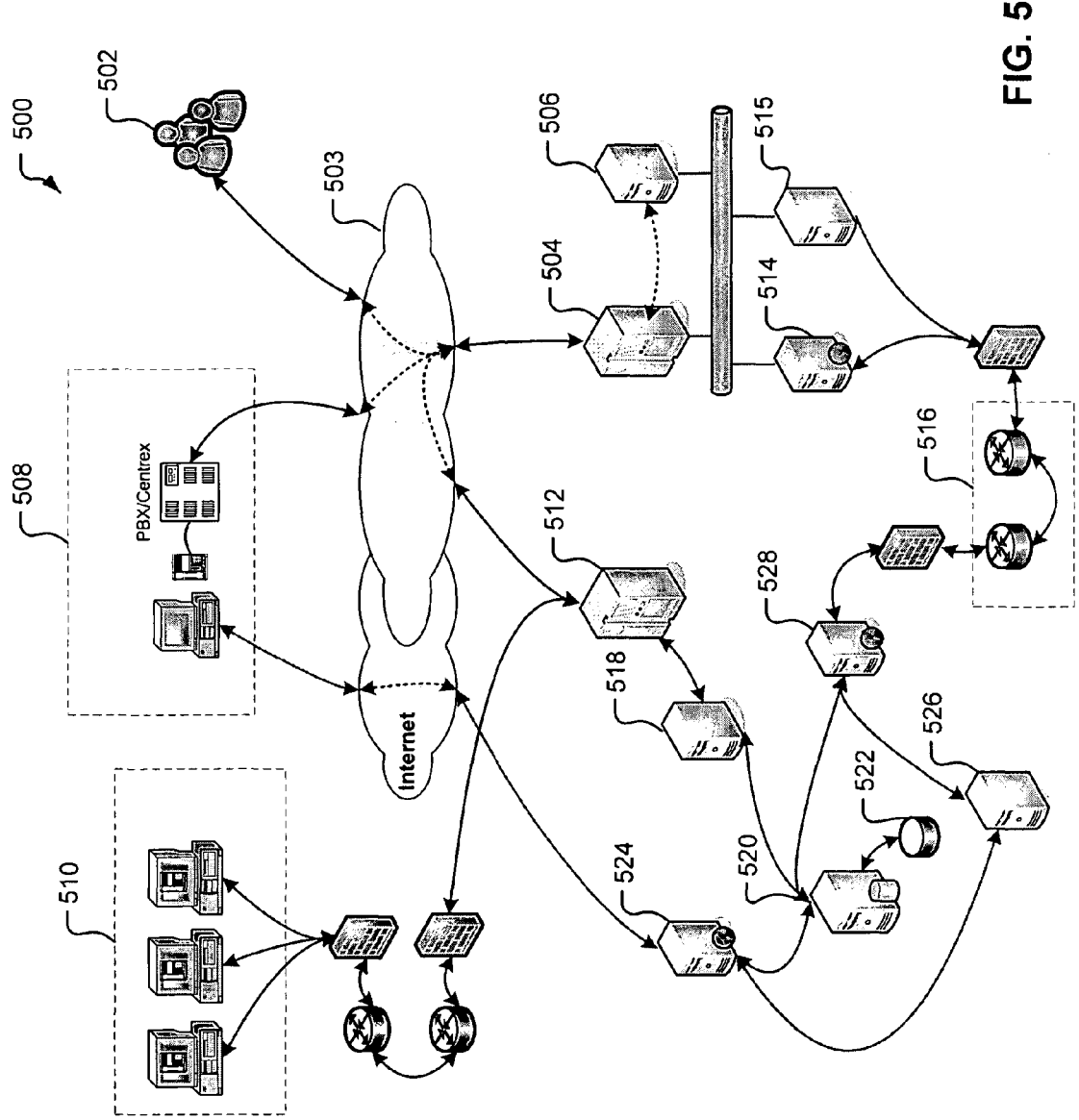
FIG. 5 illustrates another communication system according to an embodiment of the present invention.

FIG. 5 illustrates a system 500 that is another embodiment of the present invention. The description of system 500 is made with respect to a call that is handled by system 500. The call is initiated when customer 502 calls an 800 number. A network IVR 504 receives the call through VoIP network 503, identifies the client 508 from the DNIS (800 number), and initiates a script. Next, the network IVR 504 performs an address lookup from reverse lookup service 506 based on customer ANI. The customer 502 is identified and a call is initiated to client 508. If the client 508 agent is available, the call is answered and handled. The network IVR 504 stores all data including the vox via web servers 514 and 515 back to an interaction database 516.

If the client 508 agent is not available (RNA/Busy) the network IVR system 504 pulls the call back from the client 508 and redirects to a contact center such as a CMC 510. The redirected customer call is received by an automated call distribution system (ACD) 512. The ACD 512 is a system used in call centers whereby incoming calls are distributed in sequence to the first available answering point. The ACD 512 is used to reduce call waiting time for callers and to help route the call to the right person.

The ACD 512 interfaces with a computer telephony integration system (CTI) 518 at the contact center. CTI 518 is a system that provides a link between telephone systems and computers to facilitate incoming and outgoing call handling and control; the physical link between a telephone and a server providing access to the contact center's computer network. The ACD 512 notifies CTI 518 of the call with DNIS/ANI/Other and pulls up the customer information. The CTI 518 performs a data dip for customer information in server 520 and a data store 522. The call is sent to an available agent along with a screen-pop of customer info, and the call is handled and terminated at CMC 510. Through web portal 524, server 526, and server 528, the client has accesses to the information in interaction database 516, and may perform a variety of function such as generate and access reports, perform customer searches, voice recording playback, administrative options and current system setup.

Figure 6:
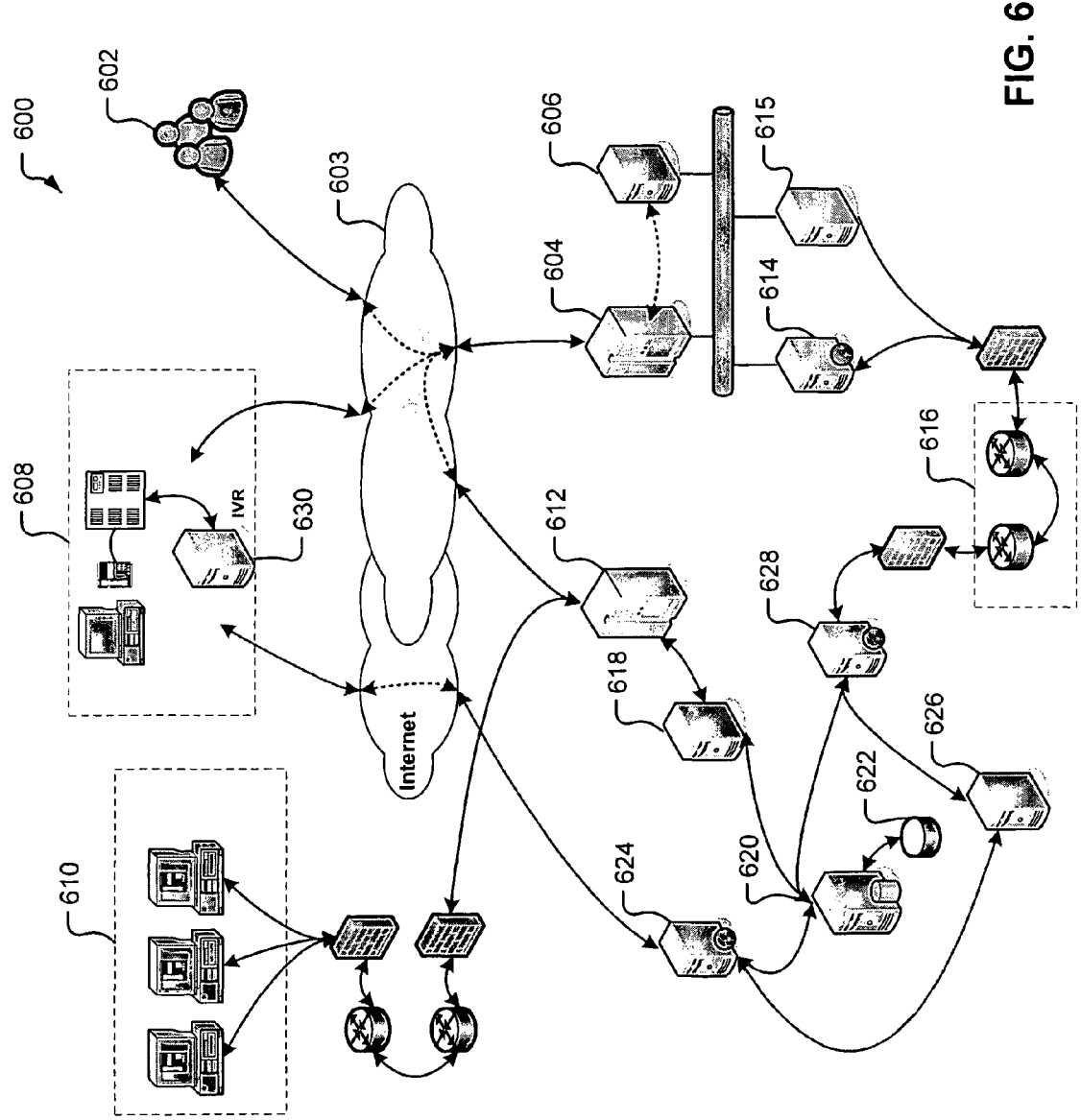
FIG. 6 illustrates yet another communication system according to an embodiment of the present invention.

FIG. 6 illustrates a system 600 according to yet another embodiment of the present invention. The description of system 600 is made with respect to a call that is handled by system 600. The call is initiated by a customer 602 calling a local number to the client 608. The client 608 receives the call and either the call is answered or the call is forwarded to a local IVR (client maintained) 630 or to the third party IVR system 604. If the call is forwarded to local IVR 630 call, it is handled by the client.

However, if the call is forwarded to the third party IVR 604, the call is received and the client is identified from DNIS. In response the IVR system 604 initiates the script associated with the client. Next, the IVR system 604 performs a reverse lookup based on the customer ANI from reverse lookup service 606. The customer is identified and a second call is initiated to CMC 610.

The redirected customer call is received by the ACD 612. Then, the IVR system 604 stores all data, including the vox, via web servers 614 and 615 back to interaction database 616. The ACD 612 notifies CTI 618 of the call with DNIS/ANI/Other and pulls up the customer information. The CTI 618 performs a data dip for customer information from server 620 and data store 622, and the call is sent to an available agent along with a screen-pop of customer info, and handled and terminated at CMC 610. The client then has access via the web portal 624, server 626, and server 628, to reports, customer searches, and voice recording playback as previously described.

In another embodiment, system 600 may handle calls made to different DNIS's by providing different services. A call may be initiated by customer 602 calling a local number to the client 608. The client 608 receives the call and automatically or manually forwards it to a DNIS for different services and associated with the network IVR system 604 through the VoIP network 603. The call is received by the network IVR system 604, which identifies the client and call type from the DNIS and initiates script for the proper greeting and prompting. Then the call is forwarded to the ACD 612 for completion of the call as previously described.

Systems 500 and 600 have been described above as illustrative examples of systems for handling a call in accordance with embodiments of the present invention. It should be understood that systems 500 and 600 are not limited to handling phone calls as described above. In other embodiments, systems 500 and 600 may perform a variety of additional functions not mentioned above. For example, systems 500 and 600 may be used to monitor the effectiveness of an advertising campaign conducted through a number of advertising medium such as radio, print, television, and Internet. The systems may be used to receive calls from customers who place calls using advertised DNIS telephone numbers. In one embodiment, each medium of communication may advertise a distinct telephone number. For example, print and radio mediums, because they are likely to be circulated locally, may advertise local numbers, while television and Internet mediums may use 800 numbers. In any case, when a customer calls using one of the advertised numbers, the call is processed through systems 500 and 600 as described above.

In some embodiments, the information stored in interactive databases 516 and 616 may be searched to determine how many calls were generated using each advertised number. Using this information, reports may be produced regarding how many phone calls are associated with each medium of advertising. The reports may include graphical representation such as charts (e.g., pie charts) or graphs (e.g., bar graphs). A client can use the reports to determine which advertising medium is more effective. As one example, the client can determine which medium of communication generates more calls per dollar spent (i.e., which medium has a lower average cost per call). The cost per call is generated by dividing the total amount of money spent on an advertising medium by the number of calls generated using the telephone number advertised using that medium. In some embodiments, web portals 524 and 624 may include software that generates a graphical representation that relates each advertising medium to the cost per call for each advertising medium.

In some embodiments, the CDR may include information that specifically indicates the advertising medium that is associated with the advertised number used by a caller to generate a call. In other embodiments, the CDR will merely store the advertised number used to generate a call, and a software application may be used to count the number of calls generated from an advertised phone number and then relate the number to its associated advertising medium. In any case, the CDR will contain some type of information that is used to determine the number of call generated from a particular advertising medium.

Figure 7:
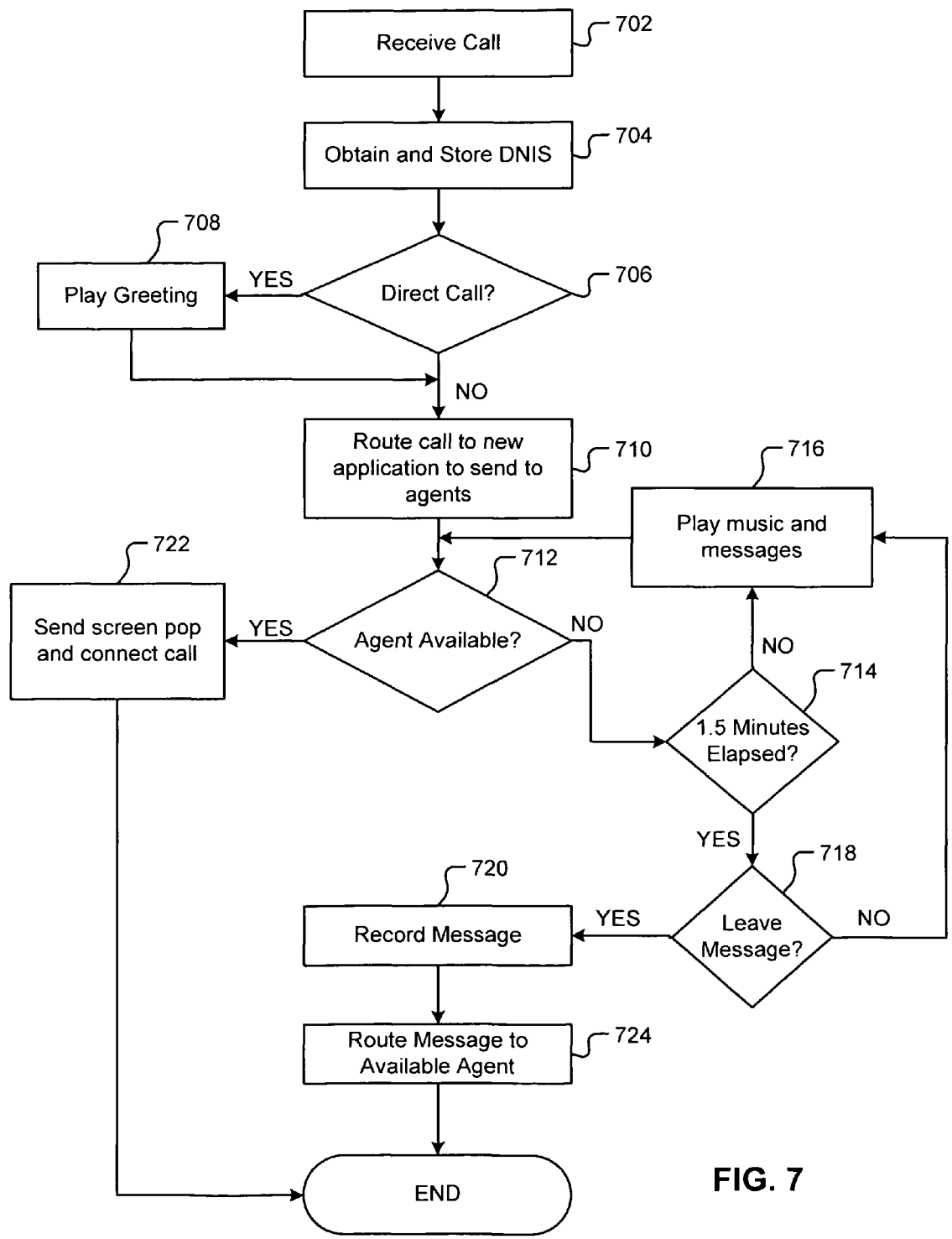
FIG. 7 illustrates an embodiment of an operational flow for handling a call at a call management center in accordance with an embodiment of the present invention.

FIG. 7 illustrates an embodiment of an operational flow 700 through a CMC in accordance with an embodiment of the present invention. The CMC is capable of servicing calls to different DNIS's. Operational flow 700 begins upon receipt of a call at operation 702. Upon receipt, operation 704 obtains and stores the DNIS of the call into a variable. Other information may also be obtained from the call at operation 704, limited only by what information is available in the incoming call.

Next at decision 706 a determination is made based on the DNIS whether to play a greeting. If the call is coming directly to the CMC via a DNIS assigned to the CMC, a greeting is played to the caller at operation 708. The greeting can be any language and may be selected based on the DNIS or as a prompt and response sequence stepped through by the caller. After the greeting, a routing operation 710 is performed. If the call is being forwarded from a client or other commercial enterprise for handling by the CMC, which can be identified through the DNIS of the call, the call is passed directly to the routing operation 710 and no greeting is played. This is because a greeting has already likely been played at the client or commercial enterprise location.

Next, flow passes to a routing operation 710 which routes the call to agents for answering using a load balancing application. A central queue may be used as part of the routing of calls. Routing may be separated by DNIS so that calls to different DNIS's are directed to different groups of agents. In addition, routing may be implemented so that preferred customers are preferentially routed to specific agents.

At decision 712, a determination is made whether an agent is available. If an agent is available the call is passed to the agent at operation 722. This includes providing the agent with information related to the call at the same time the agent answers the call. The agent is provided with a computer or terminal with a display that shows the call information, such as the CDR, for the call. The call information will include such information as the DNIS, the client, specific information related to the promotion or service associated with the DNIS and any other information that may be associated with the DNIS in the interaction database.

If no agent is currently available, the caller is placed on hold, which consists of looping through decision 714 and operation 716. Decision 714 makes a determination whether the caller has been on hold for a predetermined period of time, shown for purposes of illustration as 1.5 minutes. If the caller has not been waiting for the predetermined period of time, control passes to operation 716 where the caller is presented with music or hold announcements. For example, an automated announcement of how long the caller can expect to wait before an agent becomes available, based on the number and order of calls currently in the queue, may be played. Operation then loops back to decision 712 to determine whether an agent is available.

If a predetermined period of time has elapsed, flow passes from decision 714 to decision 718 where the caller is prompted to decide whether they want to leave a message or to continue holding. If they decide to keep holding flow passes back to operation 716 where music and/or messages are once again played. If on the other hand, the caller chooses to leave a message, the message is recorded and the DNIS is associated with the message at operation 720. In one embodiment, this is done by playing a message to the caller and then allowing the caller to record their message. The DNIS for the call is stored with the message in a group mailbox. The message is then routed to the next available agent for handling along with the call information at operation 724. Thus the agent is presented with the same information regardless of whether the agent is servicing a call at operation 722 or responding to a message left by a caller at operation 724.

Figure 8:
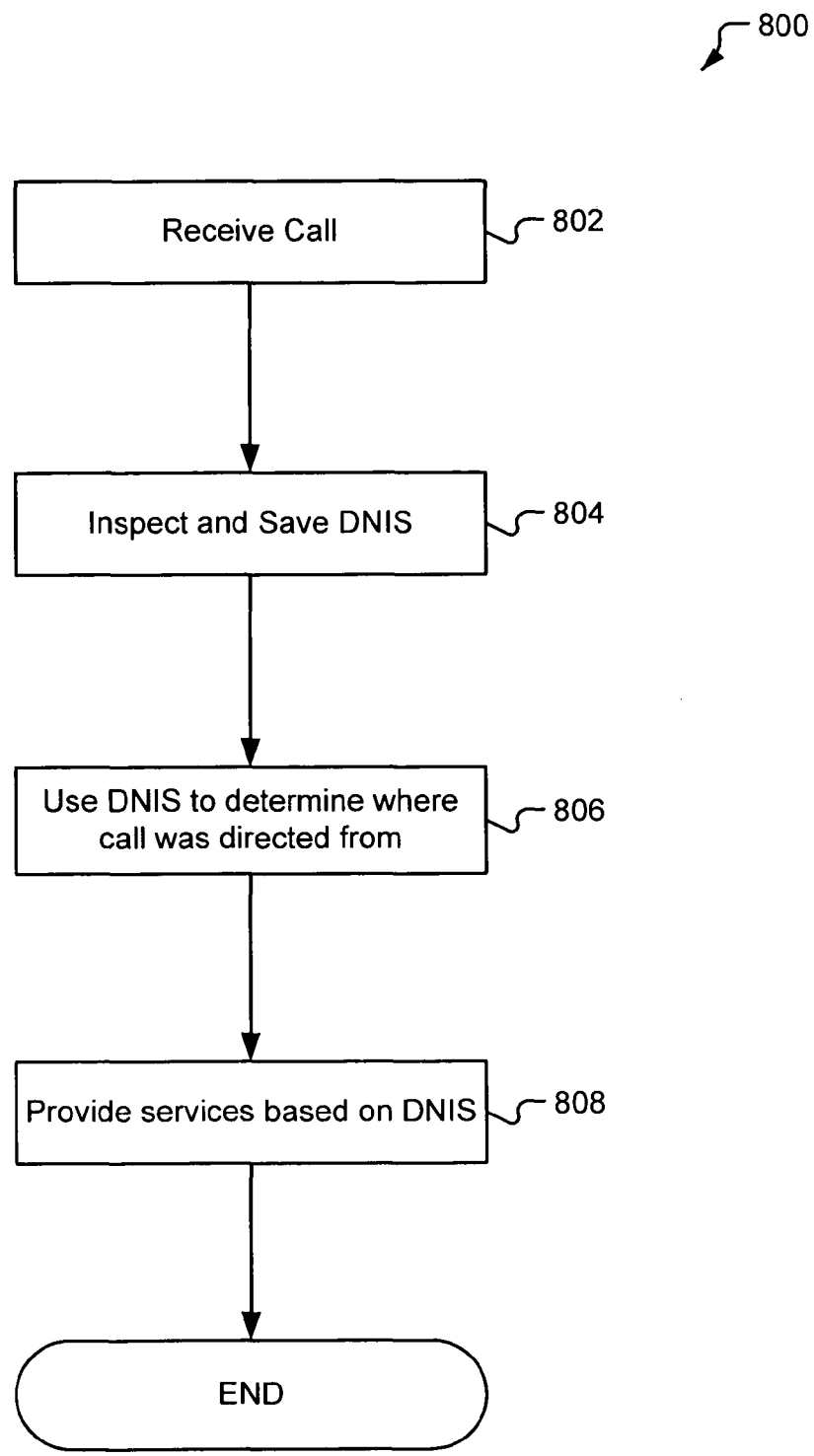
FIG. 8 illustrates an embodiment of an operational flow for handling a call at a call management center in accordance with another embodiment of the present invention.

FIG. 8 illustrates another embodiment of a call flow 800 through a CMC in accordance with an embodiment of the present invention. The call flow starts with receipt of a call at operation 802 by the CMC. At operation 804, the DNIS is inspected and saved in a variable that will be used to characterize the call within the CMC. Flow then passes to operation 808 where the DNIS is inspected and used to determine where the call is directed from and which services to provide. For example, in one embodiment the call may have been made to a DNIS associated with a bilingual advertisement. In another embodiment, the DNIS may be associated with a call that was first received by a client, and is being routed as a result of not having been answered at the client location. In yet another embodiment, the DNIS may be associated with calls that are directly received by the CMC.

At operation 806, services are provided based on the determination made at operation 806. For example, in some embodiments a greeting may be played to the caller allowing the caller to identify, in response to prompts, the reasons for calling, which will be used to further route the call. In other embodiments, the call may have been directed from a client operating a local IVR system. In this case no prompts are used although a greeting is played. In yet another embodiment, a call is forwarded from a commercial enterprise that has chosen for the CMC to prompt for different languages. In each of the scenarios, the DNIS of the call is used to determine what service to provide upon receipt of the call. The call is then routed at operation 808 through the CMC to the next available agent for providing the specific service associated with the DNIS.

It should be noted that process flow 800 has been described to illustrate an embodiment of the present invention where a DNIS is used to provide different services to a caller. As those with skill in the art will appreciate, in other embodiments process flow 800 may include other operations that are performed to provide different services to a caller. For example, in one embodiment the CMC may not operate 24 hours a day. In this embodiment, process flow 800 may include additional operations for handling calls made after the hours of operation of the CMC.

In one embodiment, the DNIS of the call is used to identify the time zone of the commercial enterprise associated with the DNIS. Such information may be stored at the CMC in a data record containing information specific to the commercial enterprise associated with the DNIS or may be obtained from a reverse lookup of the DNIS. A tailored greeting associated with the commercial enterprise can then be played to the caller notifying the caller of the business hours of the CMC, with the hours of operation being adjusted to the time zone identified from the DNIS. In this way, the caller may be unaware that the call is being handled by the CMC and not the commercial enterprise. Expanding on the after hours embodiment, the customer is then prompted to leave a message. If the customer chooses to leave a message, a voice record of the message and associated with the DNIS is created as has been described above. This message may then be stored in a mail box until an agent can respond to the message.

In an alternative embodiment, the CMC has knowledge of the business hours of the commercial enterprise. Such information may be maintained in a data record associated with the commercial enterprise and the DNIS of the commercial enterprise. The business hours identified in the data record may then be used to determine whether to play the after hours greeting and may be used to determine the hours of operation that are given to the caller in the after hours greeting.

The present invention has been described in relation to a number of embodiments. As will be apparent to those of skill in the art, the present invention in its various embodiments provides a number of advantages and features not available with conventional systems and processes. For example, embodiments of the present invention can intercept a commercial enterprise's local number and forward the call to a toll free number that is directed to a central IVR system. The call may then be transferred after playing a greeting selected by the commercial enterprise to a CMC to provide a number of services. In other embodiments, the call may be handled by a client IVR system at the client location and only forwarded to the central IVR system under certain circumstances.

In addition, in various embodiments, the present invention generates a CDR which may include a unique call identifier, a recording of the call, caller identifying information, and data obtained from third party sources such as reverse lookup services and geographic identification services. The CDR may be used to pass information to an agent at the CMC to provide services to the caller. Additionally, the data in the CDR may be accessed by the commercial enterprise via a web portal. Via this access the commercial enterprise can obtain or generate reports regarding the performance of the services provided and listen to recorded calls. The reports may include information concerning calls that were not answered or dropped before answer, calls received in certain time periods on a daily, weekly or monthly breakdown, leads received after hours and the estimated cost per call based on number of calls serviced and current billings. Metrics may be monitored including the speed to answer, the geographic distribution, and the average call duration. Also, the reports may be used to determine which DNIS, associated with a medium of advertising, generated the most calls/sales/revenue. In this way the commercial enterprise can determine which mediums of advertising are achieving better results.

Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of managing a call to a telephone number comprising:
receiving a call from a customer, wherein the call is generated from a customer who calls an advertised promotional telephone number from a source telephone having a source telephone number;
connecting the call to an IVR system based on the promotional telephone number, the IVR system maintaining a set of rules for handling calls to the promotional telephone number;
assigning a unique identifier to the call;
creating a call detail record for the call, the call detail record including the unique identifier, the source telephone number, and the promotional telephone number;
generating a map from a mapping database and the call detail record that shows the geographic location of the customer;
transmitting and displaying the call detail record to an agent; and
redirecting the call to the agent.

2. The method of claim 1, further comprising:
after the creating, retrieving information from a reverse lookup service using the source telephone number; and
storing the retrieved information in the call detail record.

3. The method of claim 1, wherein the promotional telephone number is associated with a commercial enterprise and the connecting is performed in response to the call not being answered at the commercial enterprise.

4. The method of claim 1, wherein the receiving comprises, receiving the call at a commercial enterprise after the hours of operation of the commercial enterprise.

5. The method of claim 1, wherein after the creating, transferring the call to a commercial enterprise and performing the transmitting and redirecting in response to the call not being answered at the commercial enterprise.

6. The method of claim 1, wherein the connecting comprises the use of a VoIP network.

7. The method of claim 1, further comprising:
initiating a recording of the call;
after the redirecting, terminating the call; and
storing the recording of the call in association with the call detail record.

8. The method of claim 7, wherein the recording is stored as an MP3 file.

9. The method of claim 7, wherein the call detail record and the recording are stored in a database that is accessible through a network.

10. The method of claim 9, wherein the call detail record and the recording are stored in a database that is accessible through the Internet.

11. The method of claim 1, further comprising:
playing, to the caller, a customized greeting based on the promotional telephone number.

12. A method of monitoring the effectiveness of an advertising campaign conducted through a plurality of advertising mediums, the method comprising:
receiving a telephone call from a customer, wherein the telephone call is generated from a customer who calls an advertised telephone number, each of the plurality of advertising mediums having a different advertised telephone number;
connecting the telephone call to an IVR system, the IVR system maintaining a set of rules for handling the telephone call based on the advertised telephone number used in generating the telephone call;
creating and storing a call detail record for the telephone call, the call detail record including information about the customer and the advertised telephone number used to generate the telephone call; and
generating a map from a mapping database and the call detail record that shows the geographic location of the customer.

13. The method of claim 12, wherein the method is performed for a plurality of telephone calls.

14. The method of claim 13, wherein each call detail record includes information indicating an advertising medium associated with a telephone call.

15. The method of claim 14, further comprising:
using the call detail records to determine a number of telephone calls generated from an advertising medium.

16. The method of claim 13, further comprising:
determining a cost per call for each of the plurality of advertising mediums.

17. The method of claim 12, wherein the advertised telephone number is a local number.

18. A system for handling phone calls received from a customer, the system comprising:
an IVR system for receiving a telephone call from a customer, the telephone call being generated from a customer who calls an advertised promotional telephone number from a source telephone having a source telephone number;
rules dictating how the IVR system handles the telephone call, wherein the rules are applied based on the promotional telephone number, and wherein the rules dictate the conditions for redirecting the telephone call to a call management center;
an interaction database for storing a call detail record for the telephone call, the call detail record including a unique call identifier, the source telephone number, and the promotional telephone number; and
a mapping database for use in conjunction with the call detail record for generating a map that shows the geographic location of the customer.

19. The system of claim 18, further comprising a portal server, wherein the interaction database is accessible through the portal server.

20. The system of claim 19, wherein the portal server is accessible through the Internet.

* * * * *